(12) United States Patent
Espinosa

(10) Patent No.: US 8,186,924 B1
(45) Date of Patent: May 29, 2012

(54) HOLD DOWN FASTENER ASSEMBLY

(76) Inventor: Thomas M. Espinosa, Snohomish, WA (US)

(*) Notice: Subject to any disclaimer, the term of this patent is extended or adjusted under 35 U.S.C. 154(b) by 856 days.

(21) Appl. No.: 11/907,819

(22) Filed: Oct. 17, 2007

(51) Int. Cl.
  *F16B 21/18* (2006.01)
  *E02D 27/00* (2006.01)
(52) U.S. Cl. ............... 411/536; 411/353; 52/293.3
(58) Field of Classification Search ........ 411/536, 411/353; 52/293.3, 223.13, 295, 698, 23
  See application file for complete search history.

(56) References Cited

U.S. PATENT DOCUMENTS

| | | | | |
|---|---|---|---|---|
| 2,388,056 | A * | 10/1945 | Hendricks | 403/105 |
| 2,665,931 | A * | 1/1954 | Vegren | 403/355 |
| 2,777,718 | A * | 1/1957 | Vegren | 411/411 |
| 3,812,756 | A * | 5/1974 | Wenger | 411/353 |
| 4,812,096 | A * | 3/1989 | Peterson | 411/231 |
| 4,906,031 | A * | 3/1990 | Vyse | 285/318 |
| 5,002,318 | A * | 3/1991 | Witter | 285/302 |
| 5,339,894 | A * | 8/1994 | Stotler | 166/182 |
| 5,709,415 | A * | 1/1998 | Witter | 285/304 |
| 6,161,350 | A * | 12/2000 | Espinosa | 52/293.3 |
| 6,415,673 | B1 * | 7/2002 | Erikson et al. | 74/89.42 |
| 6,494,654 | B2 * | 12/2002 | Espinosa | 411/353 |
| 6,688,058 | B2 * | 2/2004 | Espinosa | 52/293.3 |
| 6,951,078 | B2 * | 10/2005 | Espinosa | 52/23 |
| 7,013,792 | B2 * | 3/2006 | Yamaguchi | 92/15 |
| 7,159,366 | B2 * | 1/2007 | Espinosa | 52/293.3 |
| 7,340,867 | B2 * | 3/2008 | Espinosa | 52/578 |
| 7,509,778 | B2 * | 3/2009 | Leek | 52/295 |
| 7,617,642 | B2 * | 11/2009 | Espinosa | 52/223.14 |
| 7,621,085 | B2 * | 11/2009 | Commins | 52/293.3 |
| 7,665,258 | B2 * | 2/2010 | Espinosa | 52/293.3 |
| 7,762,030 | B2 * | 7/2010 | Espinosa | 52/293.3 |
| 2002/0004431 | A1 * | 1/2002 | Nye | 473/483 |
| 2004/0057809 | A1 * | 3/2004 | Nakagami | 411/368 |
| 2005/0055897 | A1 | 3/2005 | Commins | |
| 2005/0100428 | A1 | 5/2005 | Commins | |
| 2006/0133912 | A1 | 6/2006 | Commins | |
| 2006/0156657 | A1 | 7/2006 | Commins | |

* cited by examiner

*Primary Examiner* — Flemming Saether
(74) *Attorney, Agent, or Firm* — Schlesinger, Arkwright & Garvey LLP

(57) ABSTRACT

A fastener assembly comprises a first cylindrical member disposed within a second cylindrical member. One is movable relative to the other one in a first direction, and locked in a second direction opposite to the first direction. A spring is operably attached to the members to urge the one in the first direction. The members include opposing first and second cylindrical walls, respectively. A resilient member is disposed between the walls. One of the walls includes a first receiving volume configured to fully receive the resilient member and the other wall a plurality of second receiving volumes configured to only partially receive the resilient member. The resilient member is shifted between the first and second receiving volumes such that the one can move in the first direction but locked in the second direction; and the first and second receiving volumes are configured such that the resilient member is captured within a locking volume formed between the first volume and an opposing second volume when the first and second cylindrical members are locked together, the locking volume having an entrance opening that prevents the resilient member from shifting out of the locking volume and into the first receiving volume.

21 Claims, 3 Drawing Sheets

HOLD DOWN FASTENER ASSEMBLY

FIELD OF THE INVENTION

The present invention is generally directed to a fastener assembly used in a tension hold down system for walls to resist uplift and to compensate for wood shrinkage and compression loading in wood frame construction.

BACKGROUND OF THE INVENTION

The present invention is related to application Ser. Nos. 11/898,479 and 11/898,478, both filed on Sep. 12, 2007, herein incorporated by reference.

Prior art hold down systems, such as one disclosed in U.S. Pat. No. 6,951,078, includes an inner cylindrical member axially movable within an outer cylindrical member. A resilient member is manipulated between opposing circumferential grooves on the cylindrical members to allow the inner cylindrical member to move up to increase the axial dimension of the fastener assembly and to lock the two cylindrical members to each other when the inner cylindrical member tries to retract to its previous position. Under load conditions, the resilient member may shift out of its locking position, thus compromising the integrity of the fastener assembly.

Prior art hold down systems typically use a tie rod that extends inside a stud wall from the foundation to the top floor. Field conditions and the quality of the installation are such that the tie-rod may not be installed perpendicular to the horizontal bearing surface within the wall. In such a situation, the prior art fastener assembly may not sit squarely on the bearing surface and thus lose some bearing contact. The resulting installation may not be satisfactory since full contact between the bearing surfaces of the various components of the system is not achieved, which may compromise the holding capacity of the system.

SUMMARY OF THE INVENTION

A fastener assembly comprises a first cylindrical member disposed within a second cylindrical member. One of the first and second cylindrical members is movable relative to the other one in a first direction, and locked in a second direction opposite to the first direction. A spring is operably attached to the first and second cylindrical members to urge the one in the first direction. The first and second cylindrical members include opposing first and second cylindrical walls, respectively. A resilient member is disposed between the first and second cylindrical walls. One of the first and second cylindrical walls includes a first receiving volume configured to fully receive the resilient member and the other cylindrical wall includes a plurality of second receiving volumes configured to only partially receive the resilient member. The resilient member is shifted between the first and second receiving volumes such that the one of the first and second cylindrical members can move in the first direction but locked in the second direction; and the first and second receiving volumes are configured such that the resilient member is captured within a locking volume formed between the first volume and an opposing second volume when the first and second cylindrical members are locked together, the locking volume having an entrance opening that prevents the resilient member from shifting out of the locking volume and into the first receiving volume.

BRIEF DESCRIPTIONS OF THE DRAWINGS

DETAILED DESCRIPTION OF THE INVENTION

Figure 1:
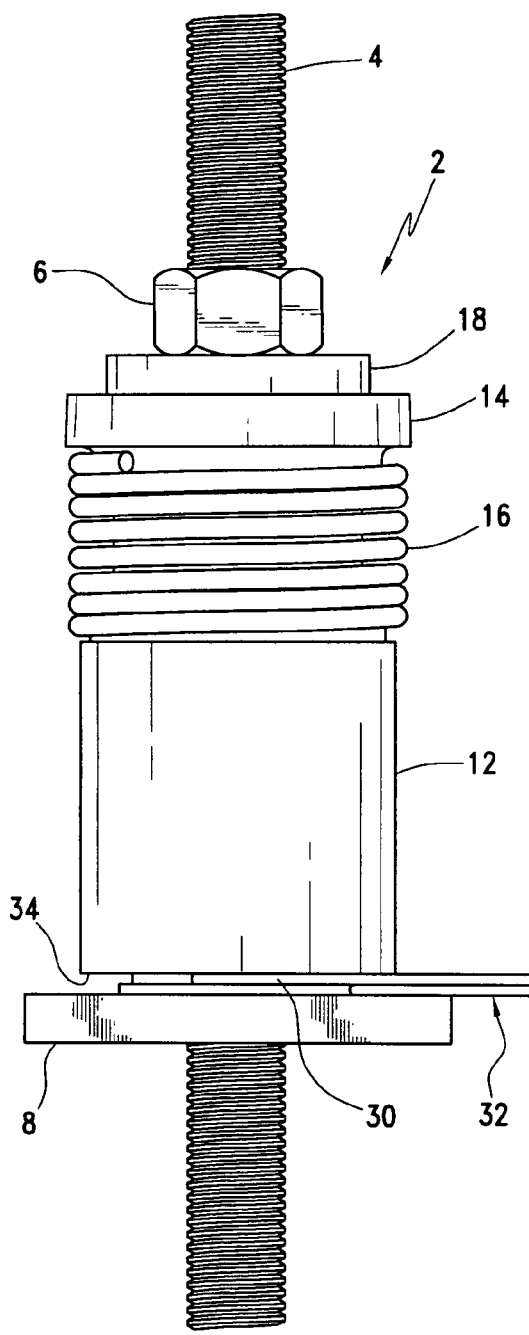
FIG. 1 is a side elevational view of an embodiment of fastener assembly made in accordance with the present invention.
Figure 2:
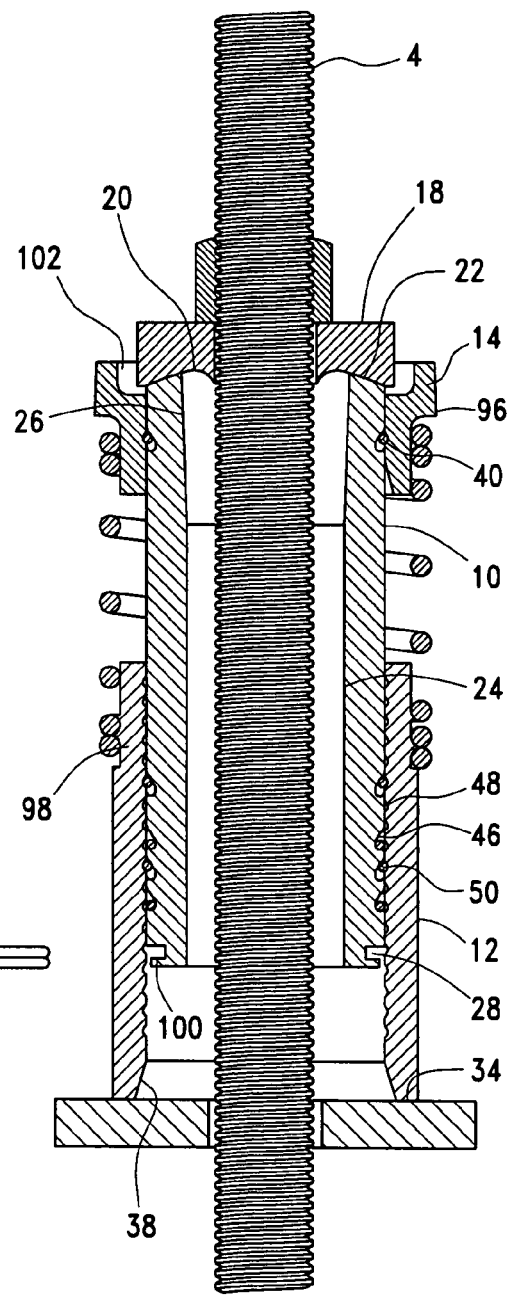
FIG. 2 is a cross-sectional view of FIG. 1, showing the fastener assembly in an expanded position.

Referring to FIGS. 1 and 2, a fastener assembly 2 made in accordance with the present invention is disclosed. The fastener assembly 2 is shown with a tie rod 4 and a nut 6 screwed to the tie rod and a bearing plate 8 typically supported on a structure of a stud wall (not shown). Typical applications of the fastener assembly 2 are disclosed in application Ser. Nos. 11/898,479 and 11/898,478, both filed on Sep. 12, 2007, herein incorporated by reference.

The fastener assembly 2 includes an inner cylindrical member 10 slidably disposed within an outer sleeve or cylindrical member 12. A top cylindrical member or sleeve 14 is secured to an upper portion of the inner cylindrical member 10. A coil spring 16 is compressed between the top cylindrical member 14 and the outer cylindrical member 12 to biasedly urge the inner cylindrical member 10 upwardly and the outer cylindrical member 12 downwardly. A washer 18 is disposed between the nut 18 and the inner cylindrical member 10. The washer 18 has an annular concave surface 20 that matches a corresponding convex surface 22 on the upper edge portion of the inner cylindrical member 10.

The inner cylindrical member 10 has central opening 24 which is larger than the diameter of the tie rod 4 to allow the rod to be slightly off vertical within the inner cylindrical member 10. The opening 24 further flares out to a larger diameter, generally indicated at 26, at the top portion of the inner cylindrical member 10 to allow even further leeway for the tie-rod to be off perpendicular with respect to the stud wall. The concave surface 20 and the convex surface 22 are advantageously in full bearing contact even when the threaded rod 10 is slightly off vertical.

Figure 3:
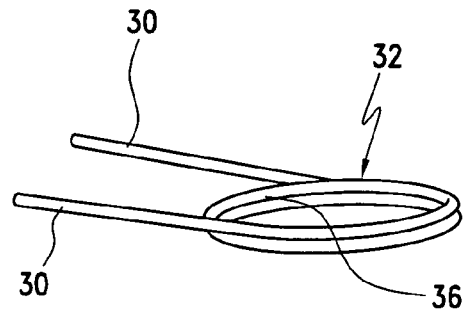
FIG. 3 is a perspective view of a removable locking member used in the present invention.

Referring to FIGS. 1 and 3, the inner cylindrical member 10 includes a circumferential groove 28 for receiving two opposed legs 30 of a removable locking member 32 for keeping the inner cylindrical member 10 from moving relative to the outer cylindrical member 12 prior to installation. The legs 30 that extend out past the bottom edge 34 of the outer cylindrical member 12 prevent the inner cylindrical member 10 from moving within the cylindrical member 12. The locking member 32 includes a loop portion 36 into which a person's finger may be inserted to pull and remove the locking member 32 from the groove 28 to release the inner cylindrical member 10, thereby allowing the fastener assembly to expand from the action of the spring 16 as the stud wall contracts due to settlement, shrinkage, etc. The locking member 32 is formed from a spring wire bent into a substantially U-shape with the legs 30 for grasping the inner cylindrical member 10 within the groove 28 and a base formed into the loop portion 36 for providing a handle by which the locking member is installed or removed.

The outer cylindrical member 12 includes a circumferential ramp surface 38 to facilitate insertion of the inner cylindrical member 10 during assembly.

Figure 4:
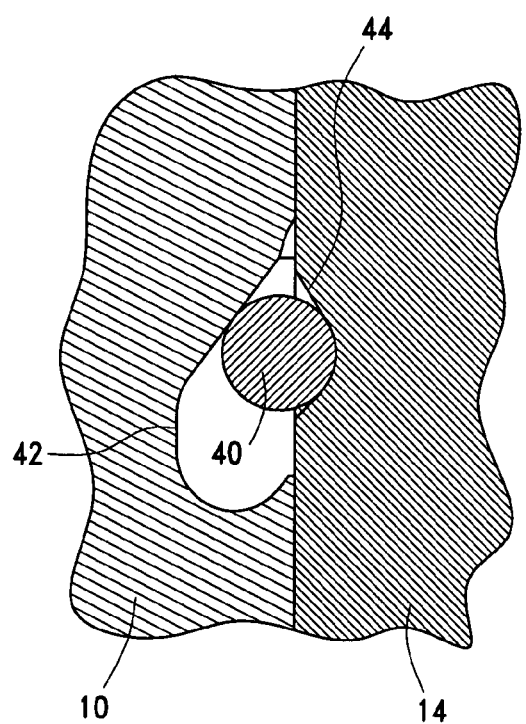
FIG. 4 is an enlarged cross-sectional view of a portion taken from FIG. 2.

Referring to FIGS. 2 and 4, the top cylindrical member 14 is secured to an upper end portion of the inner cylindrical member 10 by means of a C-ring or resilient member 40 captured in a circumferential groove or receiving volume 42 around the outside cylindrical surface of the inner cylindrical member 10 and an inner circumferential groove or receiving volume 44 along the inner cylindrical surface of the top cylindrical member 14. The grooves 42 and 44 are configured such that the resilient member 40 is fully received within the groove 42 when the top cylindrical member 14 is moved downwardly relative to the inner cylindrical member 10, and only partially received within the groove 44 to block the upward movement of the top cylindrical member 14 relative to the inner cylindrical member 10. Accordingly, the top cylindrical member 14 is locked to the inner cylindrical member 10 in the upward direction, as best shown in FIG. 4, but is able to slide downwardly for assembly purposes. The resilient member 40 is preferably circular in cross-section with more than half of its cross-sectional area extending into the receiving volume 42 in the locked position.

Figure 5:
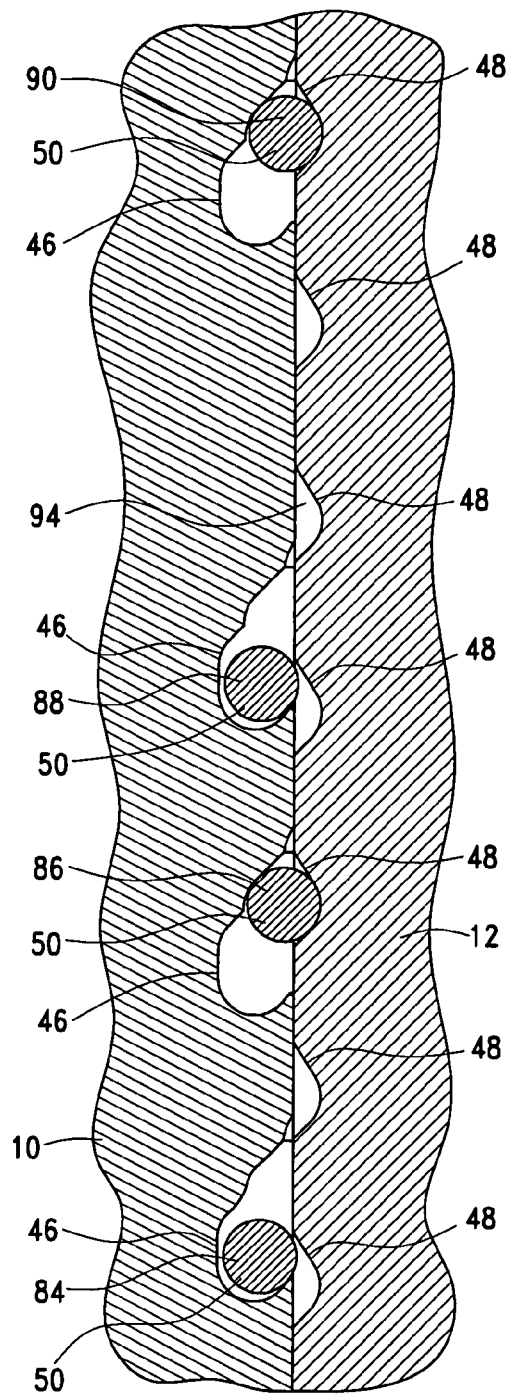
FIG. 5 is an enlarged cross-sectional view of a portion taken from FIG. 2.

Referring to FIGS. 2 and 5, the lower portion of the inner cylindrical member 10 includes a plurality of circumferential grooves or receiving volumes 46. Similarly, the inner cylindrical surface of the outer cylindrical member 14 has a plurality of circumferential grooves or receiving volumes 48. A plurality of C-rings or resilient members 50 are disposed around the grooves 46 and correspondingly aligned grooves 48. The grooves 46 and 48 are configured to manipulate the resilient members 50 to allow the upward axial vertical sliding movement of the inner cylindrical member 10 with respect to the outer cylindrical member 12, and to lock the inner cylindrical member 10 to the outer cylindrical member 12 in the opposite direction.

Figure 6:
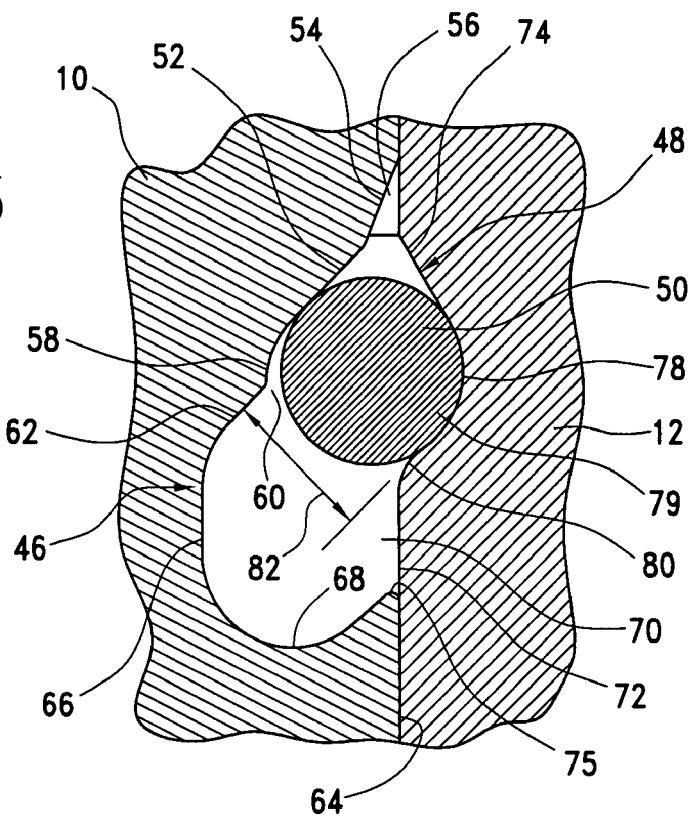
FIG. 6 is an enlarged cross-sectional view of a portion taken from FIG. 5, showing the resilient member in a locked position within a locking volume.

Details of the grooves 46 and 48 are disclosed in FIG. 6. Upward movement of the inner cylindrical member 10 will cause the resilient member or C-ring 50 into the groove 46, which is sized to completely receive the cross-sectional area of the C-ring, thereby allowing further movement of the inner cylindrical member 10. On the other hand, downward movement of the inner cylindrical member 10 is prevented, since the groove 48 is not large enough to accommodate the entire cross-sectional area of the C-ring 50. The inner cylindrical member 10 is thus locked in the downward direction. The resilient member 50 is preferably circular in cross-section.

Referring again to FIG. 6, the groove 46 includes an inclined or ramp surface 52 that bears down on the resilient member 50 in a downward direction. Another inclined or ramp surface 54 is disposed above the inclined surface 52 to form a circumferential recess 56 to provide room into which deformation of the material may flow under load conditions. The inclined surface 52 continues downwardly with a curved surface 58 that terminates into a corner 60. From the corner 60, the groove 46 continues with a surface 62 that proceeds downwardly and outwardly away from the outer surface 64 of the inner cylindrical member 10. The surface 62 proceeds into a vertical surface 66 that connects with a bottom convex surface 68 that proceeds toward the outer cylindrical member 12 and terminates at a corner 75 at the outer surface 64. A void 70 bounded by the surfaces 66 and 68 has a radial depth and height greater than the diameter of the cross-sectional area of the resilient member 50 so as to completely receive the cross-sectional area of the resilient member 50.

The groove 48 disposed on the inner surface 72 of the outer cylindrical member 12 includes an inclined or ramp surface 74 that forms an inverted "V" with the opposing ramp surface 52. The surface 74 connects with a concave surface 78 that provides a seat for the resilient member 50 in the locked position, as shown in FIG. 6. The seat 79 has a radial depth smaller than the diameter of the resilient member 50 so as to only partially receive the cross-sectional area of the resilient member 50. The surface 78 terminates at a corner 80. The corner 80 has a radius to provide room for any material flow that may occur due to heavy loads so as not to extend beyond the cylindrical surface 72 and thus interfere with the movement of the inner cylindrical member 10. The surface 74 advantageously directs the resilient member 50 toward the groove 46 when the corner 75 pushes the resilient member 50 as inner cylindrical member 10 moves upwardly.

Figure 7:
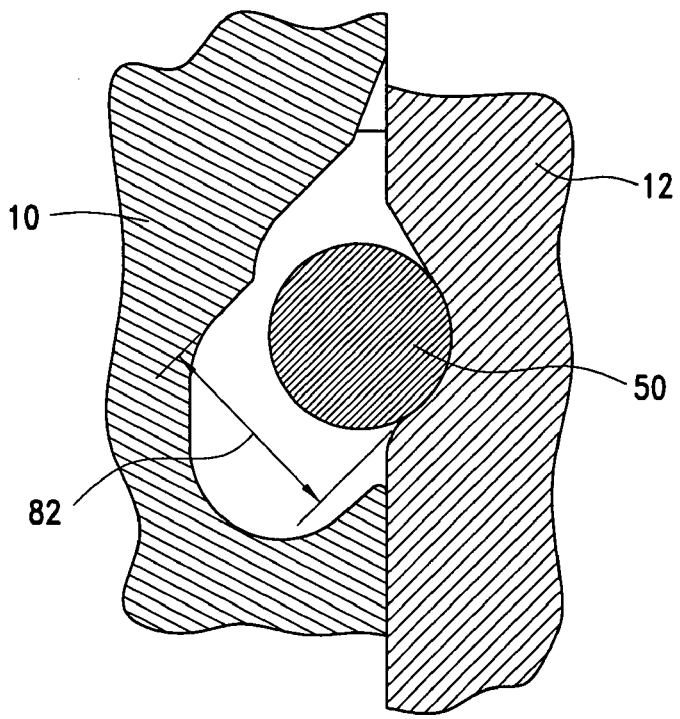
FIG. 7 is similar to FIG. 6, showing the inner cylindrical member after it has moved upwardly relative to the outer cylindrical member to enlarge the entrance opening into the full receiving volume.

The grooves 46 and 48 in the locked position, as shown in FIG. 6, together define a locking volume, generally bounded by the surfaces 52, 58, 74 and 78, with a constricted entrance opening 82 defined by the distance between the corners 60 and 80 that is smaller than the diameter of the cross-section area of the resilient member 50 such that the resilient member 50 is prevented from accidentally shifting into the void 70 under load conditions. In this manner, the resilient member 50 is maintained in the locked position relative to the inner and outer cylindrical members 10 and 12. The opening 82, which is the entrance opening into the void 70, becomes greater than the diameter of the resilient member 50 when the inner cylindrical member 10 moves upwardly relative to the outer cylindrical member 12, as best shown in FIG. 7.

Referring to FIG. 5, several resilient members 50 are provided. While resilient members 86 and 90 are shown locked against a downward movement of the inner cylindrical member 10, resilient members 84 and 88 are not. As the inner cylindrical member 10 moves upwardly to take up the slack in the tie rod 4, the resilient members 86 and 90 will become disengaged, while resilient members 84 and 88 will take up position in the next respective grooves 48 and become engaged against a downward force. Although four resilient members are shown, one or more may be provided, depending on the design load and the strength of the materials used. When only one resilient member is used, only one receiving volume 46 will be needed.

In operation, the spring 16 is initially fully compressed, as shown in FIG. 1. After the fastener assembly is installed with the nut 6, the locking member 32 is then removed. The threaded rod 4 is under tension from the action of the spring 16 and the initial torque on the nut 6. Note that the tie rod 4 is attached to the wall foundation and the bearing plate 8 would be pressing down on a bridge member between reinforcement studs or the bottom plate of the stud wall. Thus, the spring 16 would be pulling on the tie rod in the upward direction. As the building wall shrinks over time, the bearing plate 8 would move downwardly with the shrinkage of the wall. This will cause the spring 16 to push the outer cylindrical member 12 downwardly while at the same time pushing the top cylindrical member 14 and the inner cylindrical member 10 upwardly. With these relative motions, tension on the threaded rod 4 is thus maintained. The fastener assembly 2 will have expanded as shown in FIG. 2. The fastener assembly 2 is prevented from contracting back to its original position after the resilient member 50 has engaged the receiving volume 46 and the opposite receiving volume 48 as described above.

The top cylindrical member 14 has outer flange 96 for providing a stop for the end portion of the spring 16. Similarly, the outer cylindrical member 12 has outer helical (thread-like) grooves 98 for receiving the opposite end portion of the spring 16. The flange 96 and the grooves 98 keep the top cylindrical member 14 and outer cylindrical member 12 attached to each other via the spring 16.

The locking member 32 advantageously allows the fastener assembly 2 to be preloaded (when the spring 16 is compressed) prior to installation. The locking member 32 has two extending legs 30 and a portion 36 that slip into the annular groove 28 so that the inner cylindrical member 10 is stopped from moving upwardly due to the action of the compressed spring 16. Thus, the fastener assembly 2 can be installed with the spring 16 already loaded. After the fastener assembly 2 has been installed in place, the locking member 32 is then pulled out, allowing the outer cylindrical member 12 to bear down on the bearing plate 8, ready to take any slack on the threaded rod 4 due to any shrinkage in the wall. The fastener assembly 2 is advantageously activated without use of tools.

The annular groove 28 includes a bottom wall 100 which is smaller in outside diameter than the diameter of the inner cylindrical member 10 to prevent any deformations or roughness, such as burrs, on the bottom wall 100 from interfering with the inner cylindrical surface of the outer cylindrical member 12 in case such deformations or roughness are inadvertently formed when the locking member 32 is pulled out.

The concave washer 18 advantageously provides constant bearing area load transfer connection with the convex edge portions of the inner cylindrical member 10 even where the threaded rod is out of the vertical. The use of the concave washer 18 and the correspondingly shaped edge surfaces on the inner cylindrical member 10 advantageously allows for swivel or rotation when connected to the tie rod inside a wall that is not perpendicular to the bearing surface of the wall. Further, the annular concave surface 20 advantageously provides a self-centering function to facilitate installation. An annular recess 102 on the top inner edge of the top cylindrical member 14 provides room for the washer 18 to shift left or right in response to the non-verticality of the tie rod 4. The concave washer may be color coded to indicate the design load, capacity, hole size and/or diameter. The color coding may also indicate the amount of rotation or swivel provided.

The fastener assembly 2 may also be reassembled and pre-loaded manually using one's hands and without the use of tools. Referring to FIGS. 1 and 2, for example, the spring 16 is attached to the outer cylindrical member 12 and the top cylindrical member 14. The C-rings 50 are placed within the circumferential grooves 46. The C-rings 50 will be loose, extending outwardly of the outer cylindrical surface of the 64, since they are biased toward the circumferential grooves 48 on the inner surface of outer cylindrical member 12. The inner cylindrical member 10 is then inserted into the outer cylinder 12 from the bottom. The C-rings 50 will simply move in and out of the receiving volumes 46 as the inner cylindrical member 10 is slid into the outer cylindrical member 12 in an upward direction. The legs 30 are inserted into the annular groove 28 to keep the inner cylindrical member 10 from moving past the bottom edge 34 of the outer cylindrical member 12. The top cylindrical member 14 and the spring 16 are then pressed down until the top cylindrical member 14 locks with the inner cylindrical member 10 via the C-ring 40.

The fastener assembly 2 disclosed herein provides linear axial or non-rotating motion that slides over and around various common tension materials, such as the tie-rod 4, with common hardware fastener connection. The fastener assembly may be color coded to indicate travel or stroke length, capacity of useable force or load, and/or inside or outside diameter of the inner cylinder.

The spring 16 is designed and/or engineered to have a potential energy equal to or greater than the weight of the length of the tie-rod or cable (when used) below the hold down device extending to the next below hold down device or to the foundation anchor. The spring 16 may also be designed or engineered to have a minimum tension or force equal to or greater than the weight of the tie-rod or cable at full travel stroke length or designed displacement of the device. In this manner, the tie-rod or cable is advantageously fully supported throughout its length, regardless of the amount of travel of the of the outer cylindrical member relative to the inner cylindrical member, thereby preventing any buckling or bowing of the tie-rod or cable due to its own weight.

The fastener assembly disclosed herein may be used as a tensioning device as it expands to take up slack that may develop in a bolt, cable, tie rod, etc. in any structure requiring maintenance of applied tension.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention.

I claim:

1. A fastener assembly comprising:
a) a first cylindrical member disposed within a second cylindrical member, said first cylinder having an axial opening;
b) one of said first and second cylindrical members is movable relative to the other one in a first direction, and locked in a second direction opposite to said first direction;
c) a spring operably attached to said first and second cylindrical members to urge said one in said first direction;
d) said first and second cylindrical members including opposing first and second cylindrical walls, respectively;
e) a resilient member is disposed between said first and second cylindrical walls;
f) one of said first and second cylindrical walls including a first receiving volume configured to fully receive said resilient member and the other of said first and second cylindrical walls including a plurality of second receiving volumes configured to only partially receive said resilient member;
g) said resilient member being shifted between said first and second receiving volumes such that said one of said first and second cylindrical members can move in said first direction but locked in said second direction;
h) said first and second receiving volumes are configured such that said resilient member is captured within a locking volume formed between said first volume and an opposing second volume when said first and second cylindrical members are locked together, said locking volume having an entrance opening that prevents said resilient member from shifting out of said locking volume and into said first receiving volume;
i) said resilient member is circular in cross-section having a diameter;
j) said first receiving volume including a first upper ramp surface and a first lower curved surface that forms a first corner therebetween;
k) each of said second receiving volumes including a second upper ramp surface and a second lower curved surface that provides a first seat for said resilient member;

l) said second lower curved surface terminating into a second corner with said other of said first and second cylindrical walls; and m) said entrance opening is defined by a distance between said first and second corners, said distance being less than said diameter.

2. A fastener assembly as in claim 1, wherein said first and second upper ramp surfaces opposite each other and form an inverted "V".

3. A fastener assembly as in claim 1, wherein said first seat has a depth less than said diameter such that more than half of the cross-sectional area of said resilient member extends into said first volume past said second cylindrical wall.

4. A fastener assembly as in claim 3, wherein said entrance opening expands to greater than said diameter when said one of said first and second cylindrical members moves in said first direction.

5. A fastener assembly as in claim 1, wherein said first receiving volume includes a second seat having a depth and height greater than said diameter.

6. A fastener assembly as in claim 5, wherein said second seat includes a vertical wall and a lower concave wall terminating into a corner with said one of said first and second cylindrical walls.

7. A fastener assembly as in claim 1, wherein said first volume includes an annular recess disposed above said second upper ramp surface.

8. A fastener assembly as in claim 1, and further comprising a removable locking member operably associated with said first and second cylindrical members to prevent said one of said first and second cylindrical members from moving in said first direction.

9. A fastener assembly ad in claim 8, wherein said locking member is configured to be pulled out to allow said one of said first and second cylindrical members to move in said first direction.

10. A fastener assembly as in claim 8, wherein said locking member is replaceable by hand after removal to allow resetting of said spring.

11. A fastener assembly as in claim 9, wherein said locking member is formed from a wire bent into a substantially U-shape having first and second legs and a base formed into a loop.

12. A fastener assembly as in claim 11, wherein:
a) said first cylindrical member is axially movable in said first direction;
b) said first cylindrical member includes a circumferential groove on said first cylindrical wall adjacent its bottom edge;
c) portions of said first and second legs are disposed within said groove and engage an outside bottom edge of said second cylindrical member; and
d) portions of said circular loop are disposed within said groove and engage said outside bottom edge of said second cylindrical member.

13. A fastener assembly as in claim 1, wherein said spring is helical.

14. A fastener assembly as in claim 2, and further comprising:
a) a top cylindrical member attached to an upper end portion of said one of said first and second cylindrical members; and
b) said spring is disposed between said top cylindrical member and said other of said first and second cylindrical members.

15. A fastener assembly as in claim 14, wherein:
a) said top cylindrical member is attached to said first cylindrical member; and
b) said first cylindrical member is locked relative to said second cylindrical member in said first direction and movable in said second direction.

16. A fastener assembly as in claim 15, wherein:
a) said top cylindrical member includes a third cylindrical wall opposed to a portion of said first cylindrical wall, said portion of said first cylindrical wall includes a third receiving volume;
b) said third cylindrical wall includes a fourth receiving volume; and
c) another resilient member is disposed between said portion of said first cylindrical wall and said third cylindrical wall, said another resilient member is biased to occupy said fourth receiving volume.

17. A fastener assembly as in claim 1, and further comprising a washer for engaging a top edge of said one of said first and second cylindrical members.

18. A fastener assembly as in claim 17, wherein:
a) said washer includes a bottom annular concave surface; and
b) said one of said first and second cylindrical members includes a convex upper edge that mates with said bottom annular concave surface.

19. A fastener assembly as in claim 1, wherein said axial opening flares out at its top portion.

20. A fastener assembly comprising:
a) a first cylindrical member disposed within a second cylindrical member;
b) one of said first and second cylindrical members is movable relative to the other one in a first direction, and locked in a second direction opposite to said first direction;
c) a spring operably attached to said first and second cylindrical members to urge said one in said first direction;
d) said first and second cylindrical members including opposing first and second cylindrical walls, respectively;
e) a resilient member is disposed between said first and second cylindrical walls;
f) one of said first and second cylindrical walls including a first receiving volume configured to fully receive said resilient member and the other cylindrical wall including a plurality of second receiving volumes configured to only partially receive said resilient member;
g) said resilient member being shifted between said first and second receiving volumes such that said one of said first and second cylindrical members can move in said first direction but locked in said second direction;
h) said first and second receiving volumes are configured such that said resilient member is captured within a locking volume formed between said first volume and an opposing second volume when said first and second cylindrical members are locked together, said locking volume having an entrance opening that prevents said resilient member from shifting out of said locking volume and into said first receiving volume;
i) a removable locking member operably associated with said first and second cylindrical members to prevent said one of said first and second cylindrical members from moving in said first direction;
j) said locking member is configured to be pulled out to allow said one of said first and second cylindrical members to move in said first direction;

k) said locking member is formed from a wire bent into a substantially U-shape having first and second legs and a base formed into a loop;
l) said first cylindrical member is axially movable in said first direction;
m) said first cylindrical member includes a circumferential groove on said first cylindrical wall adjacent its bottom edge;
n) portions of said first and second legs are disposed within said groove and engage an outside bottom edge of said second cylindrical member; and
o) portions of said circular loop are disposed within said groove and engage said outside bottom edge of said second cylindrical member.

21. A fastener assembly comprising:
a) a first cylindrical member disposed within a second cylindrical member;
b) one of said first and second cylindrical members is movable relative to the other one in a first direction, and locked in a second direction opposite to said first direction;
c) a spring operably attached to said first and second cylindrical members to urge said one in said first direction;
d) said first and second cylindrical members including opposing first and second cylindrical walls, respectively;
e) a resilient member is disposed between said first and second cylindrical walls;
f) one of said first and second cylindrical walls including a first receiving volume configured to fully receive said resilient member and the other cylindrical wall including a plurality of second receiving volumes configured to only partially receive said resilient member;
g) said resilient member being shifted between said first and second receiving volumes such that said one of said first and second cylindrical members can move in said first direction but locked in said second direction;
h) said first and second receiving volumes are configured such that said resilient member is captured within a locking volume formed between said first volume and an opposing second volume when said first and second cylindrical members are locked together, said locking volume having an entrance opening that prevents said resilient member from shifting out of said locking volume and into said first receiving volume;
i) said locking volume includes first and second opposing ramp surfaces forming an inverted "V";
j) a top cylindrical member attached to an upper end portion of said one of said first and second cylindrical members;
k) said spring is disposed between said top cylindrical member and said other of said first and second cylindrical members;
l) said top cylindrical member is attached to said first cylindrical member;
m) said first cylindrical member is locked relative to said second cylindrical member in said first direction and movable in said second direction;
n) said top cylindrical member includes a third cylindrical wall opposed to a portion of said first cylindrical wall, said portion of said first cylindrical wall includes a third receiving volume;
o) said third cylindrical wall includes a fourth receiving volume; and
p) another resilient member is disposed between said portion of said first cylindrical wall and said third cylindrical wall, said another resilient member is biased to occupy said fourth receiving volume.

\* \* \* \* \*